(12) United States Patent
Kisaka

(10) Patent No.: US 7,164,550 B2
(45) Date of Patent: Jan. 16, 2007

(54) DISK DRIVE, POSITIONING METHOD FOR HEAD, AND SERVO SYSTEM

(75) Inventor: Masashi Kisaka, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 11/190,482

(22) Filed: Jul. 26, 2005

(65) Prior Publication Data

US 2006/0023342 A1 Feb. 2, 2006

(30) Foreign Application Priority Data

Jul. 30, 2004 (JP) ............... 2004-224749

(51) Int. Cl.
*G11B 5/596* (2006.01)
(52) U.S. Cl. .................................. 360/77.04
(58) Field of Classification Search ............ None
See application file for complete search history.

(56) References Cited

U.S. PATENT DOCUMENTS 6,937,424 B1 * 8/2005 Chang et al. ............ 360/77.04

FOREIGN PATENT DOCUMENTS

| JP | 07-050075 | 2/1995 |
|----|-----------|--------|
| JP | 08-328664 A | 12/1996 |
| JP | 10-208418 | 8/1998 |
| JP | 11-120720 | 4/1999 |
| WO | WO 00/68939 A1 | 11/2000 |

* cited by examiner

*Primary Examiner*—Andrew L. Sniezek
(74) *Attorney, Agent, or Firm*—Townsend and Townsend and Crew LLP

(57) ABSTRACT

Embodiments of the invention compensate for repeatable run-out errors without causing servo system instability. In one embodiment, HDD has a peak filter on a feedback route of a servo system. The peak filter is designed so that a rotating frequency of a magnetic disk, the high-frequency components contained in the rotating frequency and a peak match the rotating frequency and the high-frequency components. Insertion of a required peak filter into the servo system allows compensation for a repeatable run-out (RRO) error due to an event such as a deviation from the roundness of a track. Also, since a Nyquist diagram of the system satisfies required characteristics, a repeatable run-out error may be compensated for without causing instability of the servo system due to use of the peak filter.

20 Claims, 9 Drawing Sheets

(a)

(b)

DISK DRIVE, POSITIONING METHOD FOR HEAD, AND SERVO SYSTEM

CROSS-REFERENCES TO RELATED APPLICATIONS

This application claims priority from Japanese Patent Application No. JP2004-224749, filed Jul. 30, 2004, the entire disclosure of which is incorporated herein by reference.

BACKGROUND OF THE INVENTION

The present invention relates to a disk drive, a positioning method for a head, and a servo system. More particularly, the invention relates to a disk drive for compensating for repetition errors by means of a filtering process, and an associated head-positioning method and servo system.

The devices that use various forms of media such as optical disks and magnetic tapes, are known as data storage devices. Among these devices, hard-disk drives (HDDs) have come into widespread use as storage devices in computers, and are one type of storage devices indispensable in current computer systems. In addition, HDDs are not only used in computers; the excellent characteristics of HDDs are increasingly expanding their applications such as the removable memories used in dynamic image recording/reproducing apparatus, car navigation systems, digital cameras, or other products.

The magnetic disks used in HDDs each have multiple tracks formed into the shape of a concentric circle, and address information (servo information) and user data are stored onto each track. A magnetic head formed of a thin-film element can read or write data by accessing a desired region (address) in accordance with the address information. The magnetic head is fixed to a slider, and the slider is further fixed to a carriage capable of oscillating. The carriage is oscillated by a voice coil motor (VCM), and thus the magnetic head can move to a desired position on the magnetic disk. The VCM is driven by a VCM driver, and the VCM driver drives the VCM by supplying an electric current thereto according to the control data sent from a controller.

As mentioned above, each track has a data region into which data is stored, and a servo region into which servo signals are stored. A track ID, servo sector IDs, burst patterns, and others are stored as servo data into the servo region. The track ID and the servo sector IDs identify the addresses of the track and the servo sectors, respectively. The burst patterns contain information on the relative position of the magnetic head with respect to the track, and are used during track following. The burst patterns are each an array of regions in which signals were stored radially onto the disk at fixed intervals, and one burst pattern is constituted by multiple banks of signal storage regions different from one another in terms of phase.

Data reading from or writing onto the magnetic disk is executed while the position of the magnetic head is being confirmed by means of servo signals in a rotating condition of the magnetic disk. The servo signals that have been read by the magnetic head are computed by the controller. The value of the electric current to be supplied to the VCM is determined from the relationship between the current position of the magnetic head and the desired position thereof. The controller creates a control signal DACOUT for indicating the calculated electric current value, and supplies the current to the VCM driver. In case of a deviation, the carriage is driven to compensate for the deviation and the position of the magnetic head is controlled.

The servo signals, although usually recorded on the magnetic disk by use of a servo track writer, are not always recorded in perfect round form since vibration or the like can occur during recording. The particular error appears as repeatable run-out (RRO) during track following. If the RRO is significant, a track following error can result since the magnetic head (servo system) cannot follow the RRO. When the frequency components of the repeatable run-out error are limited, for example, if the run-out is great only at the rotating frequency components of the disk, it is known that the run-out can be compensated for by inserting a filter with a peak at that frequency into the servo system (for this method, refer to Patent Document 1 (Japanese Patent Laid-Open No. Hei 08-328664), for example).

It is generally known that repeatable run-out can be compensated for by integrating the state variables that have been input in the past. Since the filter used in this method has multiple peaks associated with the frequency of the repeatable run-out error, the filter can remove all of the repeatable run-out error components.

Patent Document 2 (Japanese Translation of PCT for Patent Application No. 2002-544639) discloses a technology for removing RRO components from a position error signal (PES), the deviation between a head position signal and a target signal. Removal of the RRO components from signal PES makes the magnetic head follow a substantially round path, not the shape of the track. Since the servo system operates independently of the RRO, it is possible to prevent the occurrence of a track following error due to the RRO.

BRIEF SUMMARY OF THE INVENTION

The technology of Patent Document 2, however, does not enable track servo signals to be read if their recording pattern deviates from the round track significantly in terms of shape. In terms of control, it is also necessary to multiply PES by a function having the zero point of a frequency equal to an integer multiple of the rotating frequency of the disk. Accordingly, if a disturbance synchronous with the rotating frequency exists, the disturbance cannot be distinguished from RRO. Therefore, it becomes virtually impossible for such a distance to be followed, which results in a position error. Meanwhile, as mentioned above, RRO components and a disturbance synchronous with the rotating frequency can be removed by inserting a required peak filter into the servo system. The insertion of the peak filter, however, is most likely to make the servo system unstable. If the system becomes unstable, the head cannot stay at the same position and thus becomes impossible to follow the track. For example, in the technology of Patent Reference 1, selection of a phase term is likely to result in the system becoming unstable. Also, the small-gain theorem is generally known as a sufficient requirement for stabilizing the system. This theorem, however, is only an abstract theorem defining a general sufficient requirement for stabilization, and does not specifically indicate a designing and calculating method relating to a system which satisfies the sufficient requirement. For example, the peak filter required for system design, or a more specific servo system including this peak filter is not described. During actual system design, therefore, it is necessary to determine such characteristics of a peak filter and specific servo system including the peak filter that do not cause system instability.

The present invention was made with the above circumstances as the background, and a feature of the invention is to enable RRO to be followed in a servo system without making the servo system unstable.

A first embodiment of the present invention is a disk drive with a servo system for conducting position control of a head by use of the servo signal recorded on a recording disk. In this disk drive, the servo system is further divided into: a head position signal generator (for example, a servo position signal generator 231) that generates, from the servo signal read from the recording disk, a head position signal associated with the head position; a peak filter (for example, a peak filter 234) that has a peak at multiple frequencies and compensates for repeatable run-out; and a control signal output unit (for example, a combination of an adding element 236 and a servo controller 235) outputs a control signal for a driving device which moves the head in accordance with the head position signal, a reference signal (for example, a target position signal) and an output of the peak filter; wherein, in a Nyquist diagram based on an open-loop transfer function of the servo system, when with regard to all peaks of "ωk", except "ω=0", of the peak filter, $Z_0$ is a point (−1, 0), $Z_{01}$ is a point of the open-loop transfer function of the servo system at "ωk" in the case where the above-mentioned peak filter is not present, and $Z_k$ is a point of the open-loop transfer function of the servo system at "ωk" in the case where the above-mentioned peak filter is present, the angle formed by a straight line extending from the $Z_0$ point toward the $Z_{01}$ point and a straight line extending from the $Z_{01}$ point toward the $Z_k$ point is 90 degrees or less. The servo system satisfies the above conditions, and this enables compensation for RRO. Also, the stability of the system may be obtained since the angle formed by the straight lines from the $Z_{01}$ point toward the $Z_k$ point is 90 degrees or less.

The angle formed by the straight line extending from the $Z_0$ point toward the $Z_{01}$ point and the straight line extending from the $Z_{01}$ point toward the $Z_k$ point is preferably 60 degrees or less. The angle formed by the straight line extending from the $Z_0$ point toward the $Z_{01}$ point and the straight line extending from the $Z_{01}$ point toward the $Z_k$ point is further preferably 45 degrees or less. The stability of the system may be achieved by ensuring phase margins in this manner while suppressing a processing load in accordance with the above conditions.

In specific embodiments, the angle formed by the straight line extending from the $Z_0$ point toward the $Z_{01}$ point and the straight line extending from the $Z_{01}$ point toward the $Z_k$ point is preferably 0 degree. The stability of the servo system may be further enhanced under this condition. Alternatively, it is preferable that each peak of the peak filter should agree with an integer multiple of a rotating frequency of the recording disk. Thus, more reliable compensation for RRO becomes possible.

It is preferable that the recording disk should include multiple tracks each having an M number of servo sectors, and that the peak filter should generate an output signal based on a sum of the output which the peak filter generates at an Mth previous sector, and the value obtained by multiplying, by a weighting coefficient, the multiple state variables input during movement of the head from a preset Nth previous sector to a current sector. It is possible, by providing this process, to easily realize a peak filter having a peak at a frequency equal to an integer multiple of the rotating frequency.

As an example, the above-mentioned recording disk should include multiple tracks, each having an M number of servo sectors, and the peak filter should execute processing based on the following expression:

$$u(n) = u(n-M) + \sum_{k=0}^{N} w_k X(n-k)$$ [Numeric expression 3]

where u: peak filter output, M: number of servo sectors in one track, w: previously set real number, X: state variable in the servo system, and N: previously set natural number. However, Σ is the sum calculated for the multiple terms that were selected from "k=0 to N". The above state variable may be a deviation signal based on the differential between the foregoing reference signal and the foregoing position signal.

The above state variable may be a deviation signal based on the differential between the foregoing reference signal and the foregoing position signal, and the peak filter may be an element inserted between an output of the foregoing deviation signal and an input of the foregoing control signal output unit. Alternatively, the above state variable may be a deviation signal based on the differential between the foregoing reference signal and the foregoing position signal, and the peak filter may take the output of the foregoing deviation signal, as an input, and an output of the foregoing control signal output unit and the output of the peak filter, as an addition.

A second embodiment of the present invention is a disk drive with a servo system for conducting position control of a head by use of the servo signals recorded on a recording disk. In this disk drive, the servo system is further divided into: a head that accesses the recording disk having multiple tracks each including an M number of servo sectors, and reads servo signals associated with each servo sector; a peak filter that outputs a value based on the sum of the value obtained by multiplying, by a weighting coefficient, the multiple state variables (for example, PES) that were input during movement of the head from the previously set Nth previous sector to the current sector, and the output of the peak filter that is generated at the Mth previous sector; and a control signal output unit which, in accordance with head position signals associated with the positions of the head that are determined from the servo signals of each servo sector, a reference signal, and the output of the peak filter, outputs a control signal for a driving device which moves the head; wherein, in a Nyquist diagram based on an open-loop transfer function of the servo system, when with regard to all peaks of "ωk", except "ωk=0", of the peak filter, $Z_0$ is a point (−1, 0), $Z_{01}$ is a point of the open-loop transfer function of the servo system at "ωk" in the case where the above-mentioned peak filter is not present, and $Z_k$ is a point of the open-loop transfer function of the servo system at "ωk" in the case where the above-mentioned peak filter is present, the angle formed by a straight line extending from the $Z_0$ point toward the $Z_{01}$ point and a straight line extending from the $Z_{01}$ point toward the $Z_k$ point is 90 degrees or less. The servo system satisfies the above conditions, and this enables compensation for RRO without making the system unstable.

The angle formed by the straight line extending from the $Z_0$ point toward the $Z_{01}$ point and the straight line extending from the $Z_{01}$ point toward the $Z_k$ point is preferably 60 degrees or less. The angle formed by the straight line extending from the $Z_0$ point toward the $Z_{01}$ point and the straight line extending from the $Z_{01}$ point toward the $Z_k$ point is further preferably 45 degrees or less. The stability of the system may be achieved by ensuring phase margins in this manner while suppressing a processing load in accordance with the above conditions.

The above state variable may be a deviation signal based on the differential between the foregoing reference signal and the foregoing position signal. The peak filter may be an element inserted between an output of the foregoing deviation signal and an input of the foregoing controller. Alternatively, the above state variable may be a deviation signal based on the differential between the foregoing reference signal and the foregoing position signal, and the peak filter may take the output of the foregoing deviation signal, as an input, and an output of the foregoing controller and the output of the peak filter, as an addition.

As an example, the above-mentioned peak filter should execute processing based on the following expression:

$$u(n) = u(n-M) + \sum_{k=0}^{N} w_k X(n-k) \quad \text{[Numeric expression 4]}$$

where u: peak filter output, M: number of servo sectors in one track, w: previously set real number, X: state variable in the servo system, and N: previously set natural number. However, $\Sigma$ is the sum calculated for the multiple terms that were selected from "k=0 to N".

A third embodiment of the present invention is a method of head position control in a disk drive, intended to conduct position control of a head by use of the servo signals recorded on a recording disk. This method includes: accessing the recording disk having multiple tracks which each include an M number of servo sectors; reading servo signals associated with each servo sector; and, in accordance with three factors, (1) head position signals associated with the positions of the head that are determined from the servo signals of each servo sector, (2) a reference signal, and (3) a value based on the sum of the value obtained by multiplying, by a weighting coefficient, the multiple state variables that were input during movement of the head from the preset Nth previous sector to the current sector, and the output of the peak filter that is generated at the Mth previous sector, providing an output of a control signal for a driving device which moves the head; wherein, in a Nyquist diagram based on an open-loop transfer function of the servo system, when with regard to all polar "$\omega k$", except "$\omega k=0$", of the peak filter, $Z_0$ is a point $(-1, 0)$, $Z_{01}$ is a point of the open-loop transfer function of the servo system at "$\omega k$" in the case where the above-mentioned peak filter is not present, and $Z_k$ is a point of the open-loop transfer function of the servo system at "$\omega k$" in the case where the above-mentioned peak filter is present, the $Z_0$ point is present outside a curve extending from the neighborhood of the $Z_{01}$ point through the $Z_k$ point toward the $Z_{01}$ point. According to the present embodiment, a peak filter that efficiently compensates for RRO by using both the output value generated at the Mth previous sector, and the value obtained by multiplying the multiple state variables by the weighting coefficient, may be constructed in the disk drive. Also, the transfer function satisfies the above conditions and this enables system stability to be obtained. In terms of the ease in system stability design, it is preferable that the angle formed by a straight line extending from the $Z_0$ point toward the $Z_{01}$ point and a straight line extending from the $Z_{01}$ point toward the $Z_k$ point be set to have a value of 90 degrees or less.

A fourth embodiment of the present invention is a servo system for positioning, on a rotary body, an object to be controlled, wherein the servo system includes: a servo signal reader for reading the servo signals recorded on the rotary body; and a controller having a peak filter whose gains at each of multiple frequencies equal to integral multiples of a rotational speed of the rotary body are equal to or greater than defined values, the controller generating a control signal for controlling a position of the object to be controlled, in accordance with the servo signals read above, a reference signal, and an output of the peak filter; wherein, in a Nyquist diagram based on an open-loop transfer function of the servo system, when with regard to each of all peaks of "$\omega k$", except "$\omega=0$", of the peak filter, $Z_0$ is a point $(-1, 0)$, $Z_{01}$ is a point of the transfer function of the servo system at "$\omega k$" in the case where the above-mentioned peak filter is not present, and $Z_k$ is a point of the open-loop transfer function of the servo system at "$\omega k$" in the case where the above-mentioned peak filter is present, the angle formed by a straight line extending from the $Z_0$ point toward the $Z_{01}$ point and a straight line extending from the $Z_{01}$ point toward the $Z_k$ point is 90 degrees or less. The servo system satisfies the above conditions, and this enables compensation for RRO without making the system unstable.

Preferably, the foregoing rotary body includes multiple tracks each having an M number of servo sectors, and the foregoing peak filter generates an output signal based on the sum of the output of the peak filter that is generated at the Mth previous sector, and the value obtained by multiplying, by a weighting coefficient, the multiple state variables that were input during movement from the preset Nth previous sector to the current sector. It is possible, by providing this process, to easily realize a peak filter having a peak at a frequency equal to an integer multiple of the rotating frequency.

According to the present invention, RRO may be followed without the instability of the servo system being caused.

DETAILED DESCRIPTION OF THE INVENTION

Figure 1:
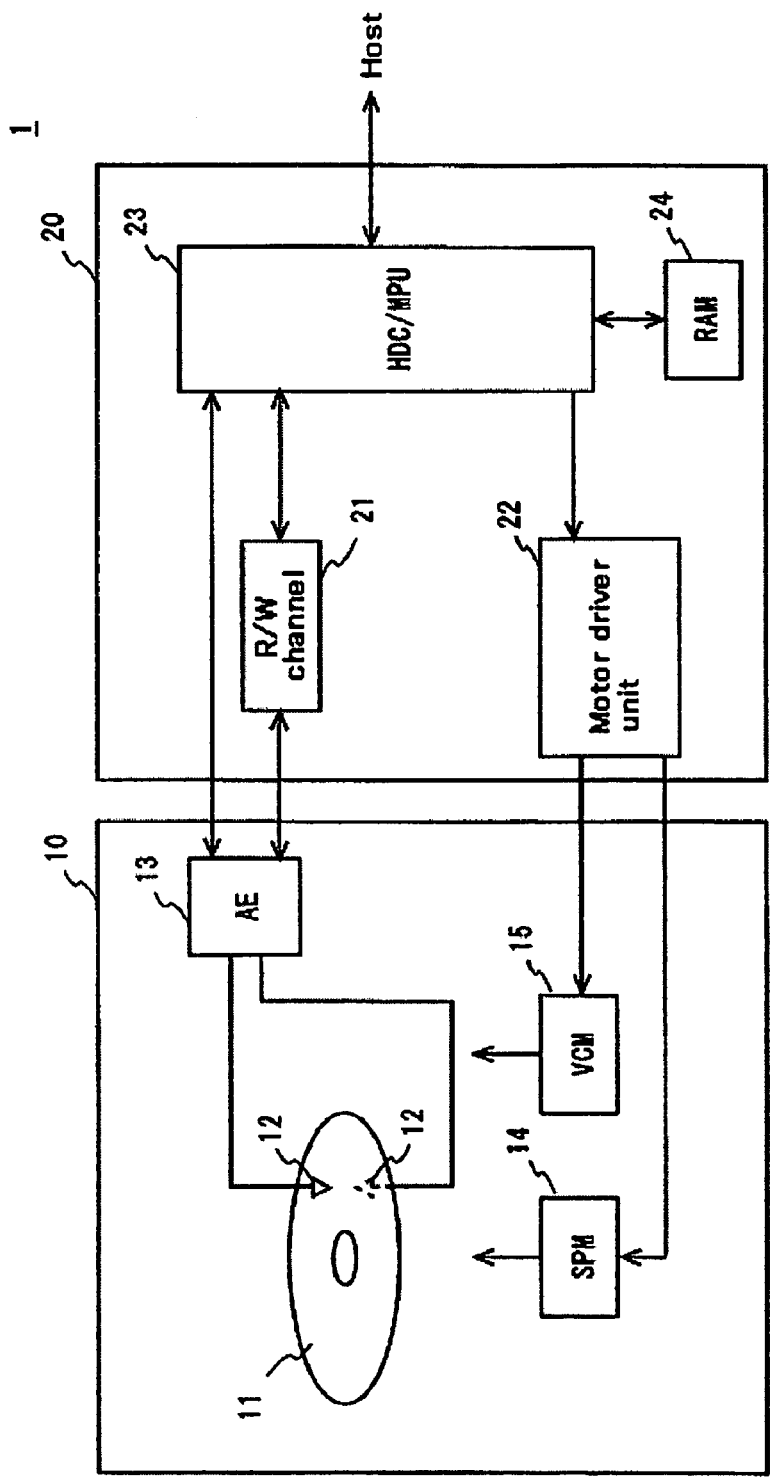
FIG. 1 is a block diagram showing a schematic configuration of the hard-disk drive according to an embodiment of the present invention.

An embodiment that may be applied to the present invention is described below. The following description relates to an embodiment of the present invention, and the invention is not limited to/by the embodiment described below. For the brevity and clarity of description, the following description and drawings are omitted and simplified as appropriate. Also, that each element of the following embodiment may be easily modified, added, and transformed within the scope of the present invention will be understood by persons skilled in the art. In each drawing, the same reference numeral is assigned to the same element, and for the brevity and clarity of description, overlapped description is omitted as required.

A hard-disk drive (HDD) of the present embodiment has a peak filter on a feedback route of a servo system. The peak filter is designed so that gains at a rotating speed of a magnetic disk and in the high-frequency components contained in the rotating speed take a defined value or more, and especially designed so that the rotating speed, its high-frequency components, and a peak match. Insertion of a required peak filter into the servo system allows compensation for a repeatable run-out (RRO) error due to an event such as a deviation from roundness of a track. Also, use of the peak filter having required characteristics allows compensation for a repeatable run-out error without causing instability of the servo system due to peak filtering.

A total configuration of the HDD in which the servo system is to be mounted is outlined to describe the servo system according to the present embodiment. FIG. 1 is a block diagram showing a schematic configuration of an HDD 1 according to the present embodiment. The HDD 1 has, in its frame 10, a magnetic disk 11 that is an example of a rotary disk (recording disk), a head element section 12 that is an example of a head, arm electronics (AE) 13, a spindle motor (SPM) 14, and a voice coil motor (VCM) 15. The HDD 1 also has a circuit board 20 fixed to the outside of the frame 10. The circuit board 20 has, thereon, a read/write channel (R/W channel) 21, a motor driver unit 22, a hard-disk controller (HDC)/MPU integrated circuit (HDC/MPU) 23, and a RAM 24. These constituent elements are only an example; for instance, they may also be mounted in one chip.

Data to be written from an external host (not shown) is received by the HDC/MPU 23 and then written onto the magnetic disk 11 via the R/W channel 21 and the AE 13 by the head element section 12. In addition, the data stored within the magnetic disk 11 is read out by the head element section 12, and the thus-read data is output from the HDC/MPU through the AE 13 and the R/W channel 21 to the external host.

Next, the constituent elements of the HDD 1 are described below. Driving mechanisms of the magnetic disk 11 and of the head element section 12 are outlined first. The magnetic disk 11 is fixed to a rotating shaft of the SPM 14. The SPM 14 is driven by the motor driver unit 22, and the SPM 14 rotates the magnetic disk 11 at a required speed. The magnetic disk 11 has, on both sides, a recording surface for recording data, and head element sections 12 associated with each recording surface. Each head element section 12 is fixed to a slider (not shown). Also, the slider is fixed to a carriage (not shown). The carriage is fixed to the VCM 15, and oscillates to move the slider and the head element section 12 radially on a surface of the magnetic disk 11. The head element section 12 may thus access a desired region.

Typically, a recording head for converting electrical signals into a magnetic field according to the data stored onto the magnetic disk 11, and a reproducing head for reconverting the electrical signals into the magnetic field applied from the magnetic disk 11, are integrally formed at the head element section 12. The number of magnetic disks 11 may be one or more, and a recording surface may be formed only on one side of each magnetic disk 11 or on both sides thereof. Additionally, the servo system of the present invention may be applied to a device having either the reproducing or recording head only.

Next, circuit blocks are described below. The AE 13 selects, from multiple head element sections 12, one head element section 12 to be subjected to data accessing, preamplifies with a fixed gain the signal reproduced by the selected head element section 12, and sends the reproduced signal to the R/W channel 21. The AE 13 also sends the recording signal received from the R/W channel 21, to the selected head element section 12.

The R/W channel 21 performs a writing process on the data acquired from the host. During the writing process, the R/W channel 21 modulates into codes the write data supplied from the HDC/MPU 23, further converts the code-modulated write data into write signals (electric currents), and supplies the data to the AE 13. Also, the R/W channel 21 performs a reading process when assigning data to the host. During the reading process, the R/W channel 21, after receiving a reading signal from the AE 13, amplifies this signal to obtain fixed amplitude, then extracts data from the acquired reading signal, and decodes the data. The data thus read out includes user data and servo data. The decoded reading data is assigned to the HDC/MPU 23.

The HDC/MPU 23 is a circuit having the HDC and the MPU integrated into one chip. The MPU operates in accordance with the microcodes loaded into the RAM 24, and executes necessary data processing in addition to total HDD 1 control such as positioning control of the head element section 12, interface control, and defect management. As the HDD 1 starts operating, the data required for control and for data processing, in addition to the microcodes operating on the MPU, is loaded from the magnetic disk 11 or a ROM (not shown) into the RAM 24.

Data that is read out by the R/W channel 21 includes servo data as well as user data. The HDC/MPU 23 conducts the positioning control of the head element section 12 that uses the servo data. A control signal (digital signal) from the HDC/MPU 23 is output to the motor driver unit 22. The motor driver unit 22 supplies a driving current to the VCM 15 according to a particular level of the control signal.

Figure 2:
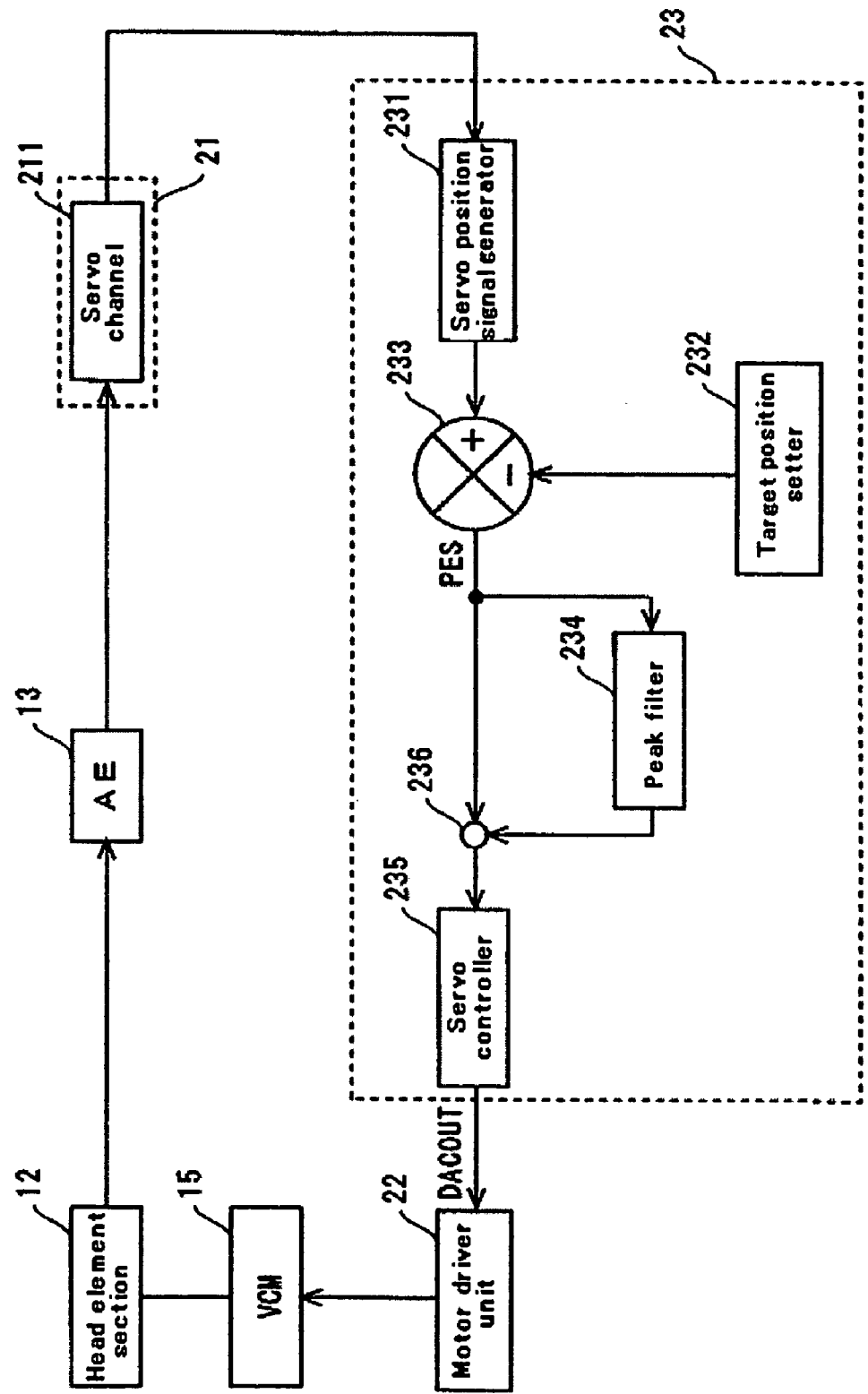
FIG. 2 is a block diagram showing a configuration of the servo system according to an embodiment of the present invention.

Next, the servo system in the HDD 1 of the present embodiment is described below. FIG. 2 is a block diagram showing a configuration of the servo system of the present embodiment. The RIW channel 21 includes a servo channel 211 that extracts a servo signal from the signal output from the AE 13. The HDC/MPU 23 includes: a servo position signal generator 231 that generates a servo position signal; a target position setter 232 that sets a target position for the head element section 12; a position error signal generator 233 that generates a position error signal (PES) on the basis of the servo position signal and the target position signal sent as a reference signal from the target position setter 232; a peak filter 234; and a servo controller 235 that outputs to the motor driver unit 22 a digital control signal (DACOUT) for controlling the VCM 15 (i.e., controlling the amount of current of the VCM 15).

Each internal constituent element of the HDC/MPU 23 may be realized in a hardware configuration or by using the microcodes operating on the MPU. An appropriate hardware/software configuration is selected according to design. Logic blocks for executing necessary processing may also be mounted in any hardware configuration by appropriate design.

Servo signals are recorded radially on the magnetic disk 11. Each of the servo signals (servo reproduction signals) includes a gap, servo AGC (Auto Gain Control) information, a servo address, and a burst pattern. The gap absorbs timing errors due to factors such as changes in rotating speed. The servo AGC information is used to determine the servo signal gain to be subjected to AGC. The servo address includes a cylinder ID, servo sector numbers, and other address information. The burst pattern is used to conduct tracking control (track following), or the like, of the head element section 12 by digitizing changes in the amplitude or other factors of the particular reproduction signal.

Each servo signal on the magnetic disk 11 is read out from the head element section 12, amplified by the AE 13, and input to the servo channel 211. The servo channel 211 becomes active at a required control period and acquires the servo signal from the AE 13. The servo channel 211, after acquiring an analog servo signal from the AE 13, also converts the analog signal into digital form at a required sampling frequency. The servo channel 211 further decodes a servo address from the A/D-converted signal. The address that has thus been decoded and an A/D-converted burst signal are transferred to the servo position signal generator 231.

On the basis of the servo signal sent from the servo channel 211, the servo position signal generator 231 generates a servo position signal that indicates a current position of the head element section 12. The target position setter 232 outputs a target position signal that indicates a target position to which the head element section 12 is to move. The position error signal generator 233 compares the servo position signal and the target position signal and generates a signal (PES) that indicates a size and direction of a deviation of the current position with respect to the target position. Signal PES indicates how far the head element section 12 is deviated from the target position internally or externally in a radial direction of the magnetic disk 11.

Signal PES that was generated by the position error signal generator 233 is input to the peak filter 234. The peak filter 234 has multiple peaks at frequencies equal to integer multiples (×1 included) of the rotating frequency of the magnetic disk 11. When analog signals from the AE 13 are converted into digital signals, the peak filter 234 has peaks at all frequencies less than Nyquist frequency equal to integer multiples of the rotating frequency.

Signal PES from the position error signal generator 233, and an output from the peak filter 234 are additively integrated by the adding element 236. The signal thus generated by the adding element 236 is then input to the servo controller 235. The servo controller 235 generates DACOUT, a control signal for controlling the VCM 15, based on signal PES and on the output signal of the peak filter 234. The DACOUT signal, an output signal to DAC of the motor driver unit 22, is input to the motor driver unit 22, which then DA-converts DACOUT and supplies a current of a required value to the VCM 15.

As described above, in the servo system of the present embodiment, the servo controller 235 generates a control signal for the VCM 15, based on the signal PES from the position error signal generator 233 and on the output signal from the peak filter 234 which filters signal PES. The peak filter 234 has multiple peaks, and it also has a gain equal to or greater than a defined value, at a frequency equal to an integer multiple of the rotating frequency. In the present example, in particular, the peak filter 234 in a preferred embodiment has a peak at multiple frequencies equal to integer multiples of the rotating frequency. Repeatable run-out errors in servo signals may be effectively compensated for by inserting the peak filter 234 into a feedback circuit of the servo system.

Figure 3:
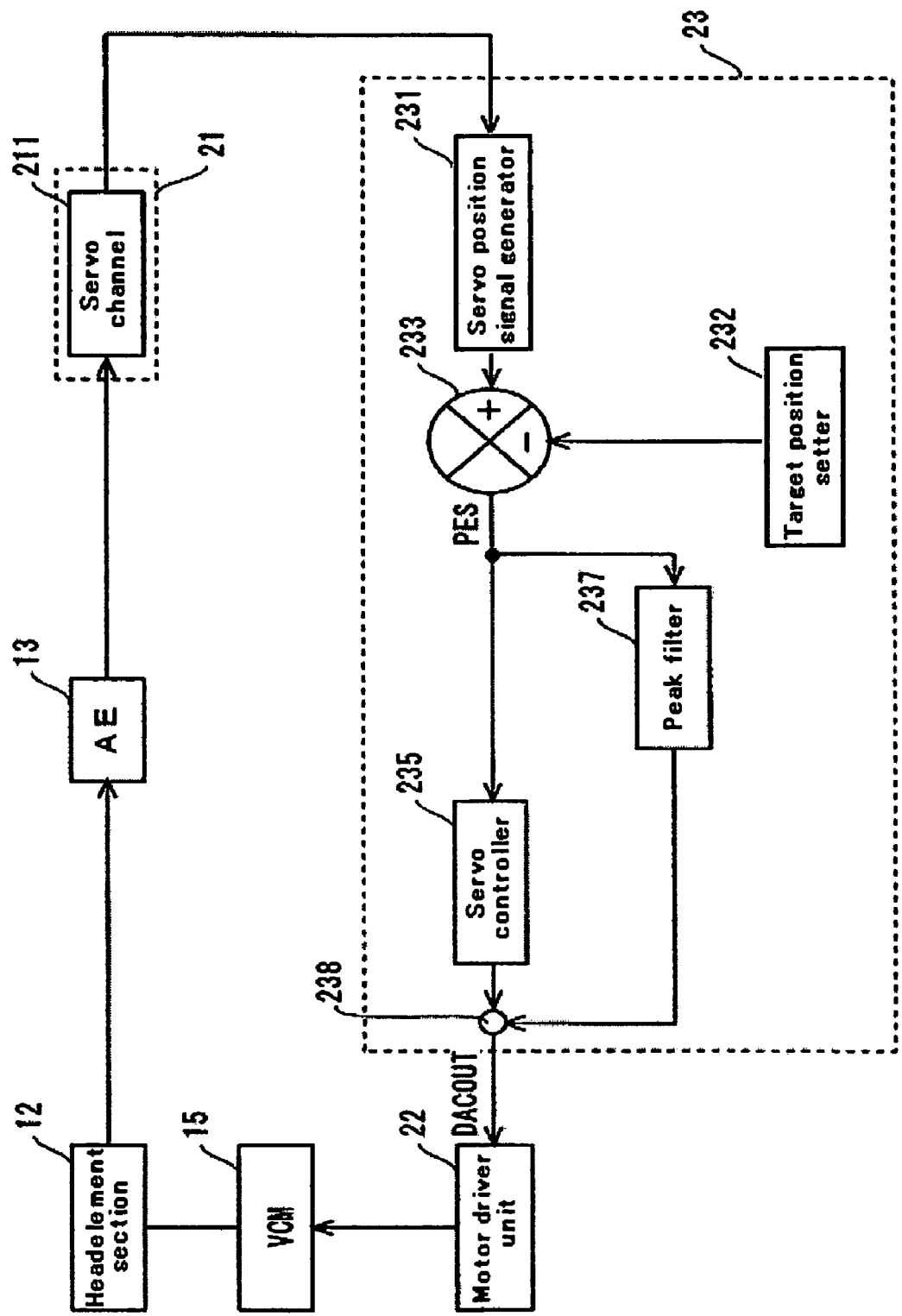
FIG. 3 is a block diagram showing another configuration of the servo system according to another embodiment of the present invention.

In this case, the inserting position of the peak filter is not limited to the section between the output of the position error signal generator 233 and the input of the servo controller 235. Instead of the above, as shown in FIG. 3, a peak filter 237 is insertable between the output section of the signal PES and the input section to DACOUT. The servo controller 235 generates a control signal based on the signal PES received from the position error signal generator 233. Also, signal PES from the position error signal generator 233 is input to the peak filter 237. The output signal from the peak filter 237 and the control signal from the servo controller 235 are input to an adding element 238, and the signal thus generated by the adding element 238 is then input as control signal DACOUT to the motor driver unit 22.

As described above, repeatable run-out errors may be compensated for by inserting the required peak filter 234 or 237 into the feedback route of the servo system. Characteristics of the peak filters 234 and 237 and of the servo system including the peak filter are described below. The peak filter in the present embodiment calculates the sum of the peak filter output generated at the Mth previous sector (M is the number of servo sectors in one track, and is equivalent to a previous full turn of the head), and the value obtained by multiplying, by a weighting coefficient, the state variables of selected multiple servo sectors that were read before movement to the current servo sector. That is to say, the peak filter executes the arithmetic process conforming to the following numeric expression:

[Numeric expression 5]

$$u(n) = u(n-M) + \sum_{k=0}^{N} w_k X(n-k) \quad (1)$$

In the above numeric expression (1), "u" is a peak filter output, M is the number of servo sectors in one track, "w" is a previously set real number, X is a state variable in the servo system, and N is a previously set natural number. However, $\Sigma$ in the above expression is the sum calculated for the multiple terms that were selected from "k=0 to N". The number of multiple terms selected or which term is to be selected is determined by design. The signal PES or the output signal DACOUT to the motor driver unit 22 is usable as the state variable X.

Described below is an example of an element functioning as the peak filter 234 or 237 by integrating the filter output generated at the Mth previous sector, and the required number of state variables from the M number of previous sectors (i.e., at the end of the previous full turn of the head), especially, error component PES. That is, in the foregoing description, signal PES is equivalent to the state variable X. The peak filter 234 or 237 executes arithmetic processing defined by the following expression:

[Numeric expression 6]

$$u(n) = U(n-M) + \sum_{k=0}^{k} w_k \, PES(n-(M-k)) \quad (2)$$

where K is a natural number predetermined by design. Also, Σ, unlike that of numeric expression (1), means the sum of each term from "k=0" to "K".

Z-transformation of these numeric expressions is represented as "f(z)/($z^M$-1)", in which "f(z)" is a required function of "z", and this transfer function has a pole at "z" which satisfies "$z^M$-1". As described above, the peak filter 234 or 237 has a peak at all places of the rotating frequency of the magnetic disk 11, and of higher-order frequencies, and may therefore remove repeatable run-out error components at all frequencies.

The peak filter 234 or 237 that executes arithmetic processing represented by above numeric expression (2) is to determine an output value based on the sum of the filter output generated at the Mth previous sector, and the value obtained by multiplying, by a weighting coefficient, state variables associated with multiple sectors from the Mth previous sector to the current sector. Signals PES [PES (n–M) to PES (n–M+k)] associated with multiple successive sectors from the Mth previous sector to the current sector are used in the example of numeric expression (2). However, as shown in numeric expression (1), what section of the set of signals PES associated with the multiple sectors from the Mth previous sector to the current sector is to be used is determined by design. For example, signals associated with a definite number of previous sectors [PES (n) to PES (n–N)] from the current sector may be used, which is, in integration of the above expression, equivalent to a change of "(M–k)" to "k" in the equation (2). The servo system has determined control signal DACOUT by digital processing, and of higher-order frequencies than the rotating frequency, only those lower than the Nyquist frequency become a problem.

A peak filter 234 or 237 having a value of K=3 in a system of M>3 is shown below as an example of an element which obeys above expression (2). The peak filter 234 executes arithmetic processing that obeys the following numeric expression (3):

[Numeric expression 7]

$$u(n) = u(u-m) + w_{M-3}PES(n-M+3) + \\ W_{M-2}PES(n-M+2) + w_{M-1}PES(n-M+1) + w_M PES(n-M) \quad (3)$$

This is equivalent to a case in which M>3 and f(z) are taken as having assigned to a cubic polynomial. More specifically, Z-transformation of above numeric expression (3) gives f(z) as follows:

[Numeric Expression 8]

$$u(z) = z^{-m}U(Z) + w_{M-3}Z^{3-M}\,PES(z) + \Lambda + w_M z^{-M}\,PES(z)$$

$$U(Z) = W_{M-3}Z^3 + \Lambda + w_M)PES(z)/)z^M - 1)$$

$$f(Z) = w_{M-3}Z^3 + w_{M-2}Z^2 + w_{M-1}Z - w_M \quad (4)$$

Figure 4:
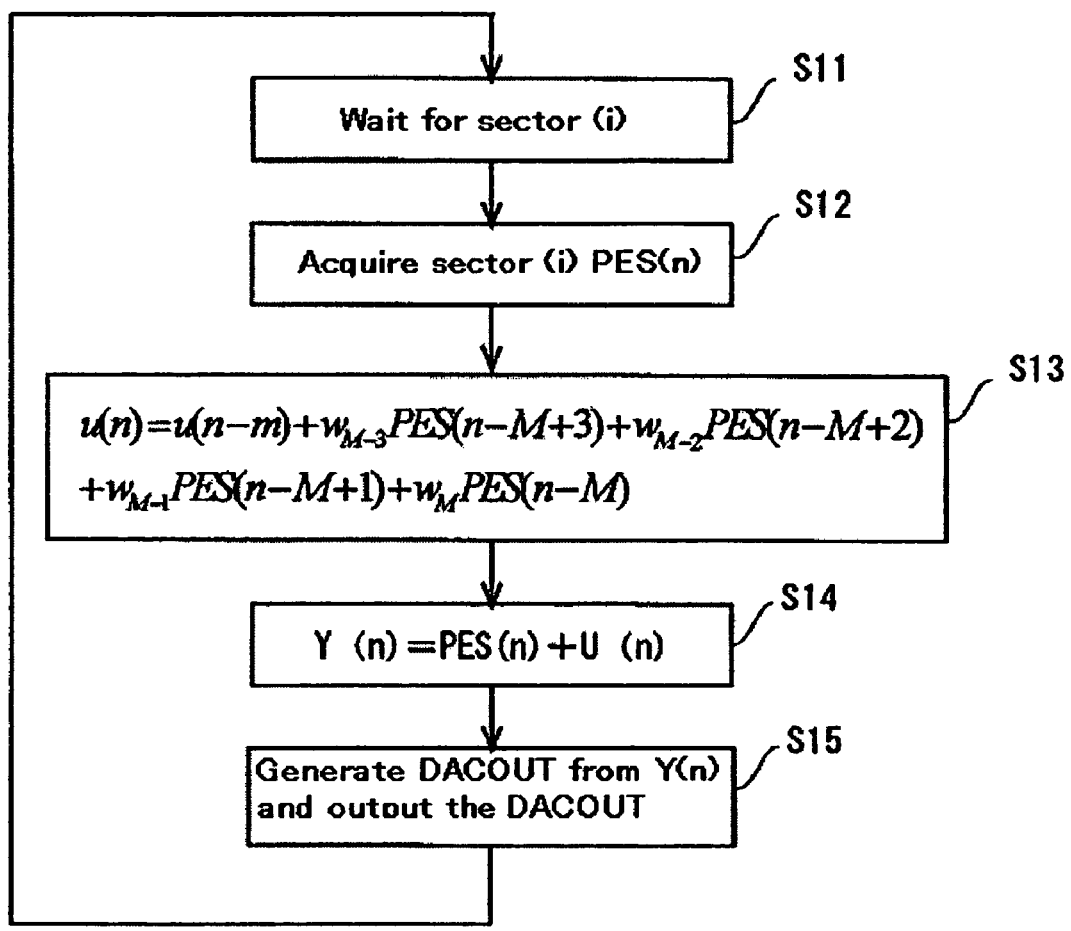
FIG. 4 is a flowchart that shows process flow of the servo system according to an embodiment of the present invention.

An example of processing in which the peak filter 234 that conducts processing of numeric expression (3) is used in the system of FIG. 2 is described below with reference to a flowchart of FIG. 4. After waiting for movement to a sector (i) in step S11, the system acquires, in step S12, PES(n) that has been read at the sector (i). The peak filter 234 uses acquired PES(n) to calculate U(u) by conducting arithmetic processing shown in the numeric expression of step S13. In step S14, an adding element 236 adds the U(n) output of the peak filter 234 and PES(n), and then outputs Y(n). In step S15, the servo controller 235 generates control signal DACOUT from Y(n) and outputs the signal to the motor driver unit 22.

It is necessary at this time to prevent the servo system from being made unstable by the peak filter 234 that executes the above arithmetic processing. Insertion of any peak filter is likely to result in the system becoming unstable. To ensure servo system stability, it is necessary to insert a peak filter of required characteristics. To add state variables of the past as in the present example, the number of terms (value of K) added in the peak filter 234 or 237 and coefficients "w" of each term need to be appropriately set so as to satisfy the required characteristics. The peak filter 234 or 237 that maintains system stability, a method of designing the servo system including this peak filter, and the characteristics that the servo system and the peak filter are to satisfy are described below.

The characteristics that the peak filter 234 or 237 is to satisfy may be defined by using a Nyquist diagram. Take a transfer function of the peak filter 234 or 237 as F(z), a transfer function of the servo controller 235, as C(z), and a transfer function from an output of the servo controller 235 to that of the servo position signal generator 231, as P(z). Open-loop transfer function H1 in the servo system of FIG. 2 is expressed as H1=PC(1+F), and open-loop transfer function H2 in the servo system of FIG. 3 is expressed as H2=P(C+F).

Figure 5:
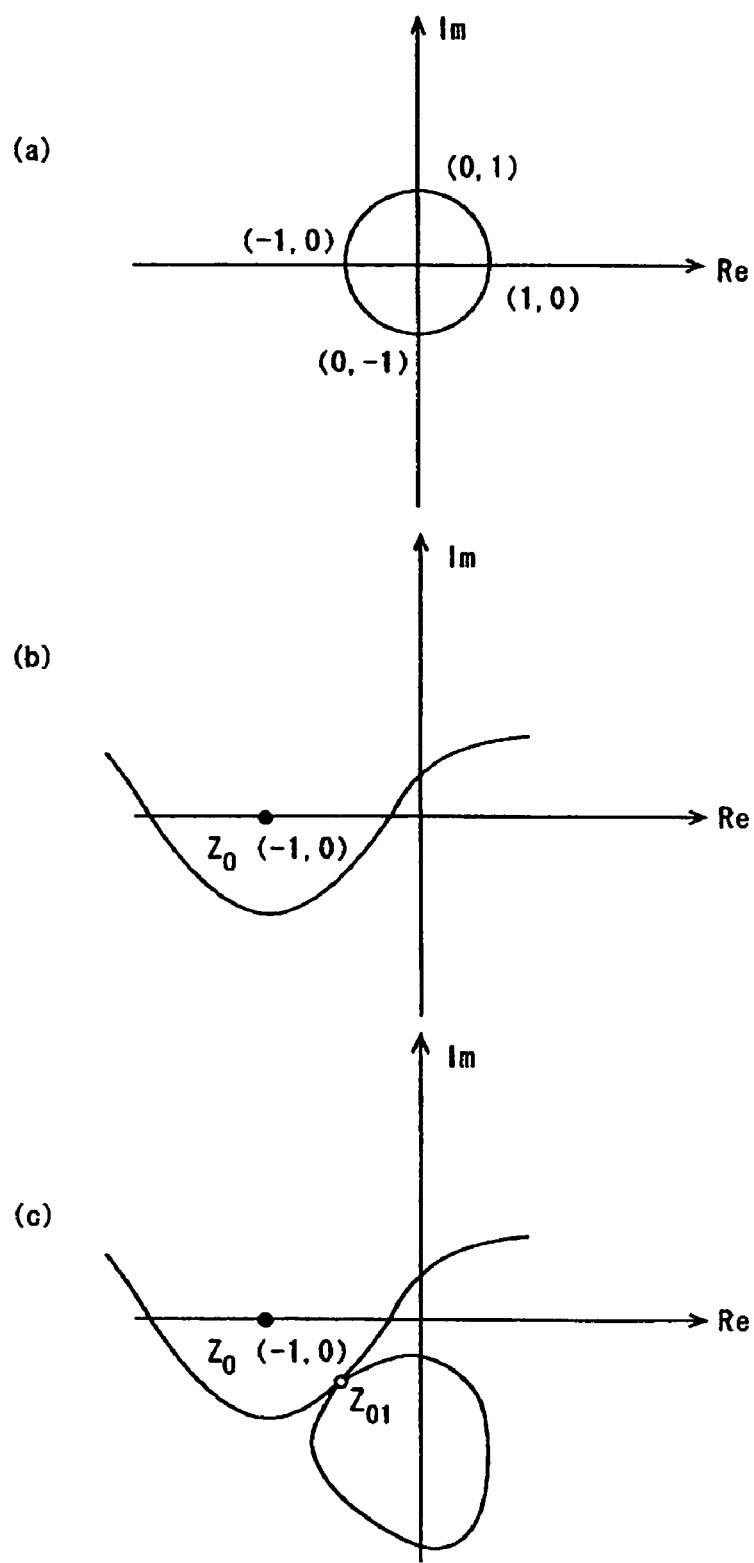
FIGS. 5A, 5B and 5C show Nyquist diagrams of open-loop transfer functions of the servo system according to an embodiment of the present invention.

In a servo system not having an inserted peak filter 234 or 237, open-loop transfer function H is expressed by H3=PC. When "z" changes from 0 to 2π as shown in FIG. 5A, a Nyquist diagram (vector locus) of this open-loop transfer function H3 (=PC) yields, for example, such a curve looks as shown in FIG. 5B (this curve only forms part of an example of a locus). In the system having the inserted peak filter 234 or 237 of the present embodiment, a Nyquist diagram of open-loop transfer function H1 or H2 changes, for example, from the curve of H3, shown in FIG. 5B, to such a curve as shown in FIG. 5C.

Since the peak filter 234 or 237 has a peak at each of frequencies equal to integer multiples of the rotating frequency of the magnetic disk 11, the Nyquist diagram changes in the neighborhood of each frequency equal to integer multiples of the rotating frequency. The vector locus at one frequency value (polar value "$Z_0$") generated by the peak filter 234 or 237 is shown in FIG. 5C. In actuality, the Nyquist diagram changes in the neighborhood of each frequency equal to integer multiples of the rotating frequency.

Transfer function F of the peak filter 234 or 237 has, on a unit circle, multiple poles "zi" equivalent to an integer-multiple frequency "ωi" of the rotating frequency. When each such pole is regarded as a stable pole, the system may be stabilized if the number of times a vector locus generated by open-loop transfer function H1 or H2 (or the transfer function of the peak filter 234, 237) circles a point of $Z_0$(−1,0) on a complex plane is not increased. In the example of FIG. 5C, the number of times the vector locus circles the point of $Z_0$(−1,0) is not increased. At each frequency equal to integer multiples of the rotating frequency, the system is stable when the above requirement is satisfied.

The above requirement for stabilizing the system may be derived from the principle of argument or from the Nyquist's stability criterion that applies this principle to a control system. According to the principle of argument, when the number of zero points of a function Q(z) in a circumference C (i.e., the number of "z" points at which H becomes zero) and the number of poles of Q(z) (i.e., the number of "z" points at which 1/Q diverges) are taken as Z and P respectively, and both include duplication levels, the curve generated by duplicating the circumference C by means of Q rotates through (P-Z) turns in a forward direction (clockwise).

When a frequency changes from 0 to $2\pi$, "z" of z-transformation rotates through a full turn around a unit circle. From Nyquist's stability criterion, when "z" rotates through a full turn around the unit circle, the difference between the number of zero points and that of poles, in the unit circle of a characteristic equation [1+H(z)] of the system, is identified according to how often H(z) circles a point of (−1, 0). When pole positions are previously known, the number of poles in the unit circle is identified from the number of rotations, and provided that all zero points as many as determined by degree exist in the unit circle, the system is stable.

In the present embodiment, transfer function F of the peak filter 234 or 237 has multiple poles "zi" on a unit circle, and each pole "zi" is regarded as a stable pole. That is, when transfer function F is represented as

[Numeric expression 9]

$$F = \frac{f(z)}{z^M - 1} \qquad (5)$$

the vector locus at each pole "zi" of the transfer function F of the peak filter 234 is obtained by:

[Numeric expression 10]

$$F(zi) = \frac{f(z)}{z^M - r} \quad \text{(from } r < 1 \text{ to } r \to 1\text{)} \qquad (6)$$

Figure 6:
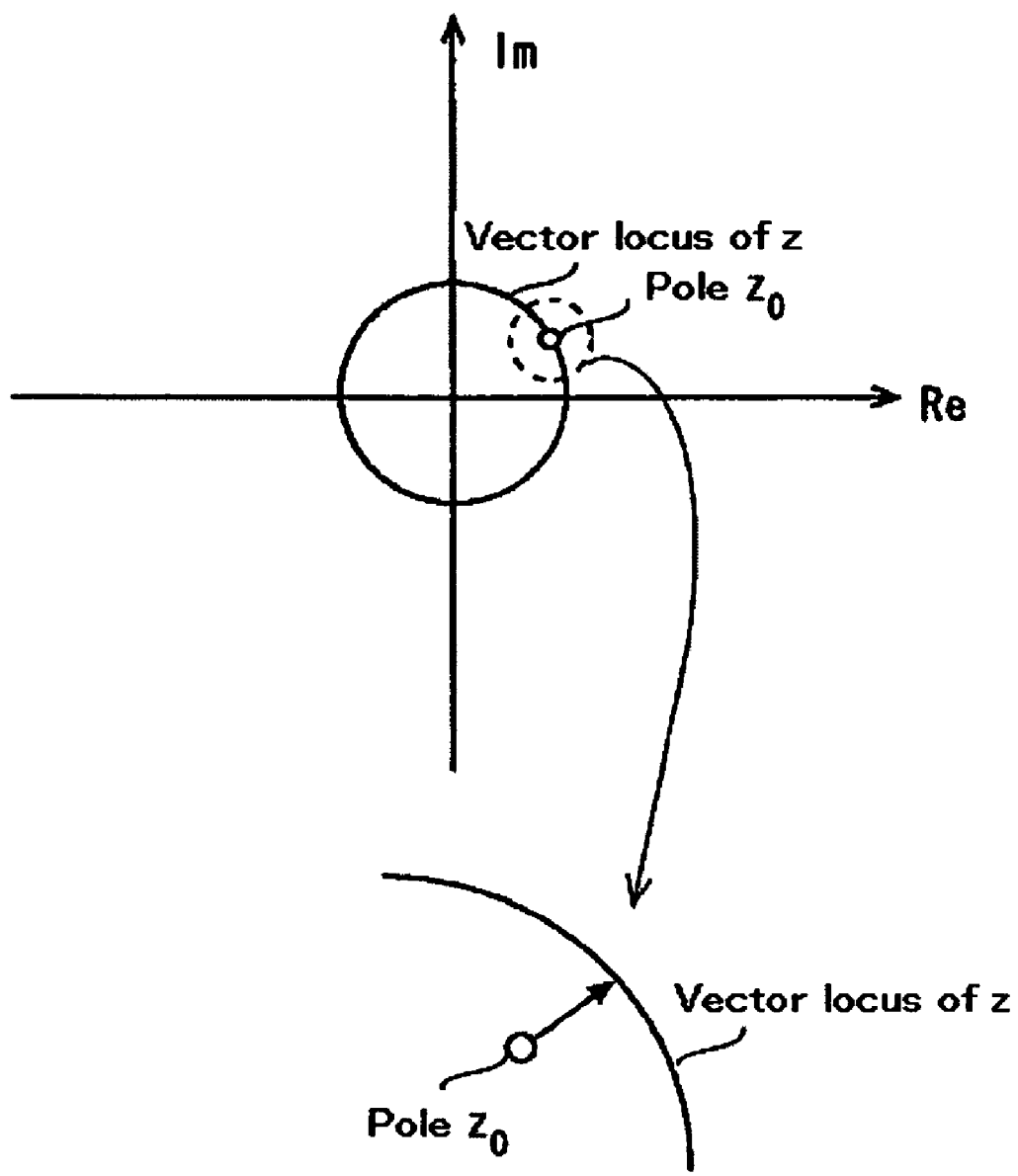
FIG. 6 shows poles of the open-loop transfer functions of the servo system according to an embodiment of the present invention.

FIG. 6 shows one pole "z0" on the unit circle, as an example. As shown in FIG. 6, in the unit circle, pole "$Z_0$" is calculated as a value (from r<1 to r→1) infinitely close to the unit circle.

If a pole is present inside the vector locus (unit circle) of "z", in order for the system to be stable, it is necessary that the number of rotations with respect to (−1, 0) of the open-loop transfer function should not be changed by insertion of the peak filter 234 or 237. In other words, it is necessary that as shown in FIG. 5C, the number of rotations of H(z) with respect to (−1, 0) should not be increased with respect to the locus of "z" on the unit circle. The vector locus of $1/(z^M-1)$ infinitely goes far at the frequencies that satisfy $z^M=1$. Therefore, even if the vector locus starts from a point distant from (−1, 0), the system is apt to become unstable since there is the possibility of the locus approaching the point of (−1, 0). In the design method of the present embodiment, the number of terms in the polynomial shown in numeric expression (2) and coefficients "w" of each term are set so that the peak filter 234 or 237 or the system including the filter satisfies the above characteristics.

Figure 7:
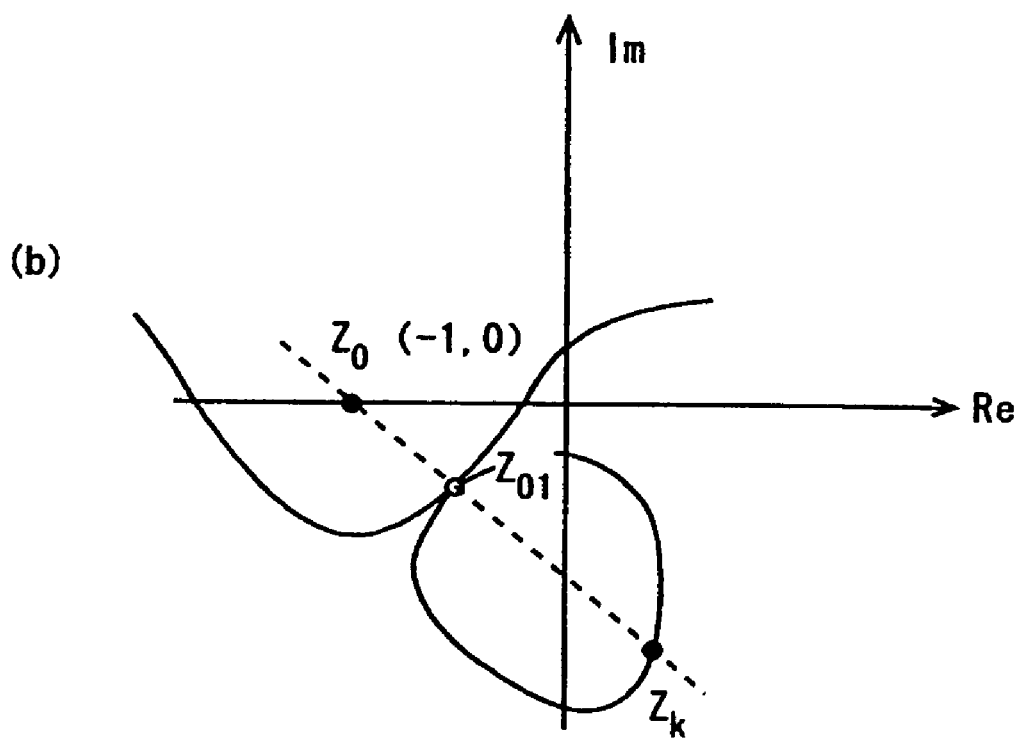
FIG. 7 is a Nyquist diagram showing the conditions that the open-loop transfer functions of the servo system according to the present embodiment satisfy.

As described above, it is the requirement for stabilization that the locus of H(z), generated by use of the peak filter 234 or 237, should not surround $Z_0(-1, 0)$. Here, for a central frequency "zk" of the peak filter, take the value of a transfer function (e.g., above-mentioned H3), in the case of the peak filter 234 or 237 not being inserted, as $Z_{01}$, and the value of a transfer function (e.g., above-mentioned H2 or H2), in the case of the peak filter 234 or 237 being inserted, as $Z_k$. As shown in FIG. 7, on the straight line defined by points $Z_0$ and $Z_{01}$, if point $Z_k$ is present on an opposite side to point $Z_0$ across point $Z_{01}$, the transfer function in the case of the peak filter 234 or 237 being inserted generates a vector locus directed away from $Z_0$. Accordingly, when $Z_k$ is present at the position where the above requirement is satisfied, a stable system may be reliably formed.

The transfer function of the peak filter 234 that satisfies the requirement shown in FIG. 7 is described below taking the composition (transfer function H1) of FIG. 2 as an example. The following numeric expression is satisfied with reference to FIGS. 2 and 7:

[Numeric Expression 11]

$$Z_k = PC(1+F) = Z_{01}(1+F) = Z_{01} + \lambda(Z_{01}-Z_0)\lambda > 0 \qquad (7)$$

Hence:

[Numeric expression 12]

$$F = \lambda \frac{Z_{01} - Z_0}{Z_{01}} \qquad (8)$$

is the desirable transfer function of the peak filter 234.

A phase of the peak filter 234 may be specified as follows. Here, the transfer function F of the peak filter 234 is expressed as follows:

[Numeric expression 13]

$$F = \frac{f(z)}{z^M - 1} \qquad (9)$$

Consider the phase at the following central frequency of a peak:

[Numeric expression 14]

$$z_k = \exp(j\omega_0 k) \quad \left(\omega_0: \frac{2\pi}{M},\ k: \text{integer from 1 to } M/2\right) \qquad (10)$$

For calculation of an angle of the transfer function F, substituting the denominator of numeric expression (9) as follows

[Numeric Expression 15]

$$z^M - 1 \to z^M - r \qquad (11)$$

and then calculating the convergence value obtained at the central frequency by r→1 yields

[Numeric Expression 16]

$$\angle F(z_k) \approx \angle f(z_k) \qquad (12)$$

at the central frequency. In this numeric expression, $\angle F$ denotes the angle of F. It follows from the relationship between numeric expressions 8 and 12 that:

[Numeric Expression 17]

$$Lf(z_k) = L\frac{Z_{01} - Z_0}{Z_{01}} \qquad (13)$$

A stable system with an inserted peak filter 234 may be constructed by determining function "f(z)" so that numeric expression (13) should hold at the rotating frequency and all its higher harmonics of the magnetic disk 11. Regarding a gain, a small value, for example, may be assumed, in which case, the filter operates in a narrow frequency band and exhibits desirable characteristics. Although the phase of "ω=0" is not determined by the above expression, the phase may be zero since integer terms are stabilized only by NFB (Negative Feed Back).

Although a sufficiently stable system may be constructed by making numeric expression (13) hold at the rotating frequency and all its higher harmonics of the magnetic disk 11, the order of the function "f(z)" needs to be increased to satisfy the above requirement. Increasing the order makes arithmetic processing complex and the circuit scale or computing time increase. To construct a stable system, the above requirement is most preferable. It is not required, however, that the above requirement not always be satisfied to ensure system stability. Although system stability decreases, provided that the peak filter 234 satisfies the requirement shown below, the stability required of the system may be satisfied.

When, with respect to a central frequency "kω0" of the peak filter 234, "kω0+q" (q→0) yields an asymptotic property, consideration of the vector locus generated by the transfer function F of the peak filter 234 allows

Figure 8:
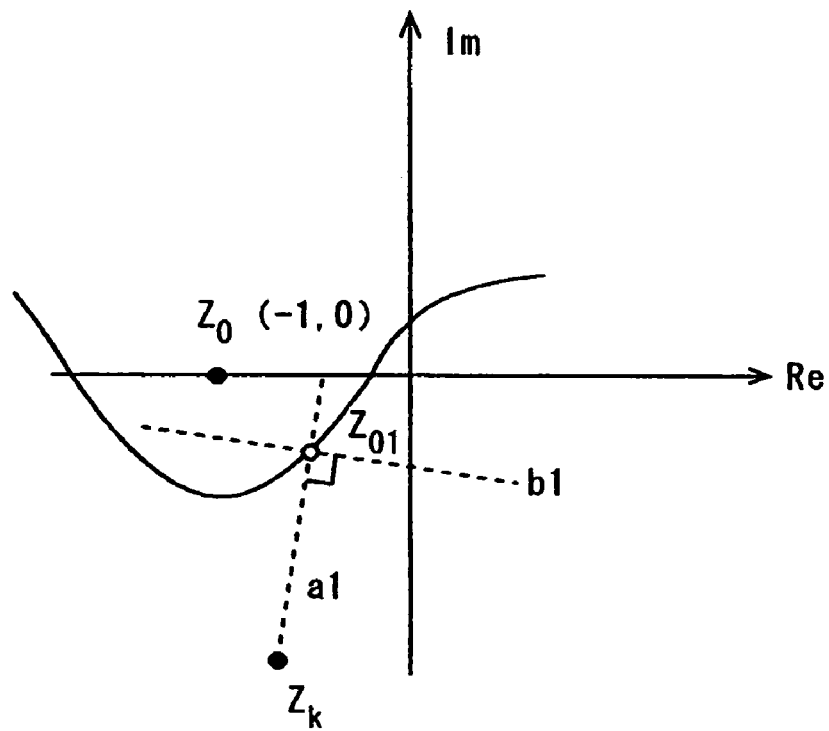
FIGS. 8A and 8B are other Nyquist diagrams showing the conditions that the open-loop transfer functions of the servo system according to the present embodiment satisfy.
Figure 8:
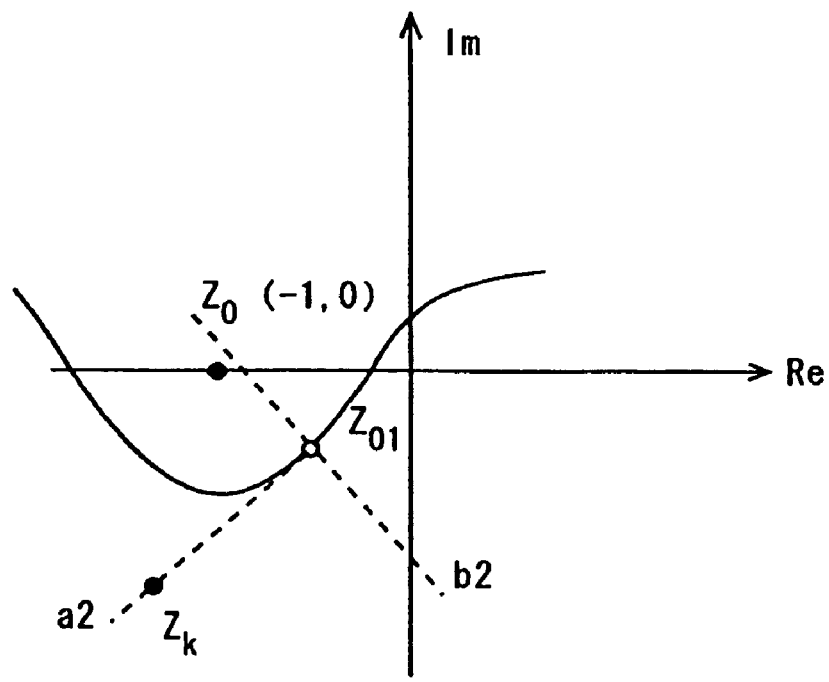

[Numeric expression 18]

$$LF(k\omega_0 + q) = L\frac{f(z_k)}{z^M - 1} \qquad (14)$$
$$= L\frac{f(z_k)}{e^{j(k\omega_0 + q)M} - 1}$$
$$= L\frac{f(z_k)}{jqM}$$
$$= LF(k\omega_0) - \frac{\pi}{2}$$

to be obtained from the relationship between numeric expression (12) and "j (imaginary number)=exp(jπ/2)". That is to say, the angle of the transfer function F of the peak filter 234 in the neighborhood of the central frequency "kω0" is 90 degrees off with respect to the angle of the transfer function F at the central frequency "kω0". FIG. 8 shows an extending direction of the vector locus of open-loop transfer function H in the neighborhood of "kω0". In the neighborhood of "kω0", the vector locus of the open-loop transfer function H (the vector locus generated by the open-loop transfer function F in the neighborhood of "kω0") extends from the neighborhood of $Z_{01}$, in a direction orthogonal to the line that connects $Z_{01}$ and $Z_k$.

Figure 9:
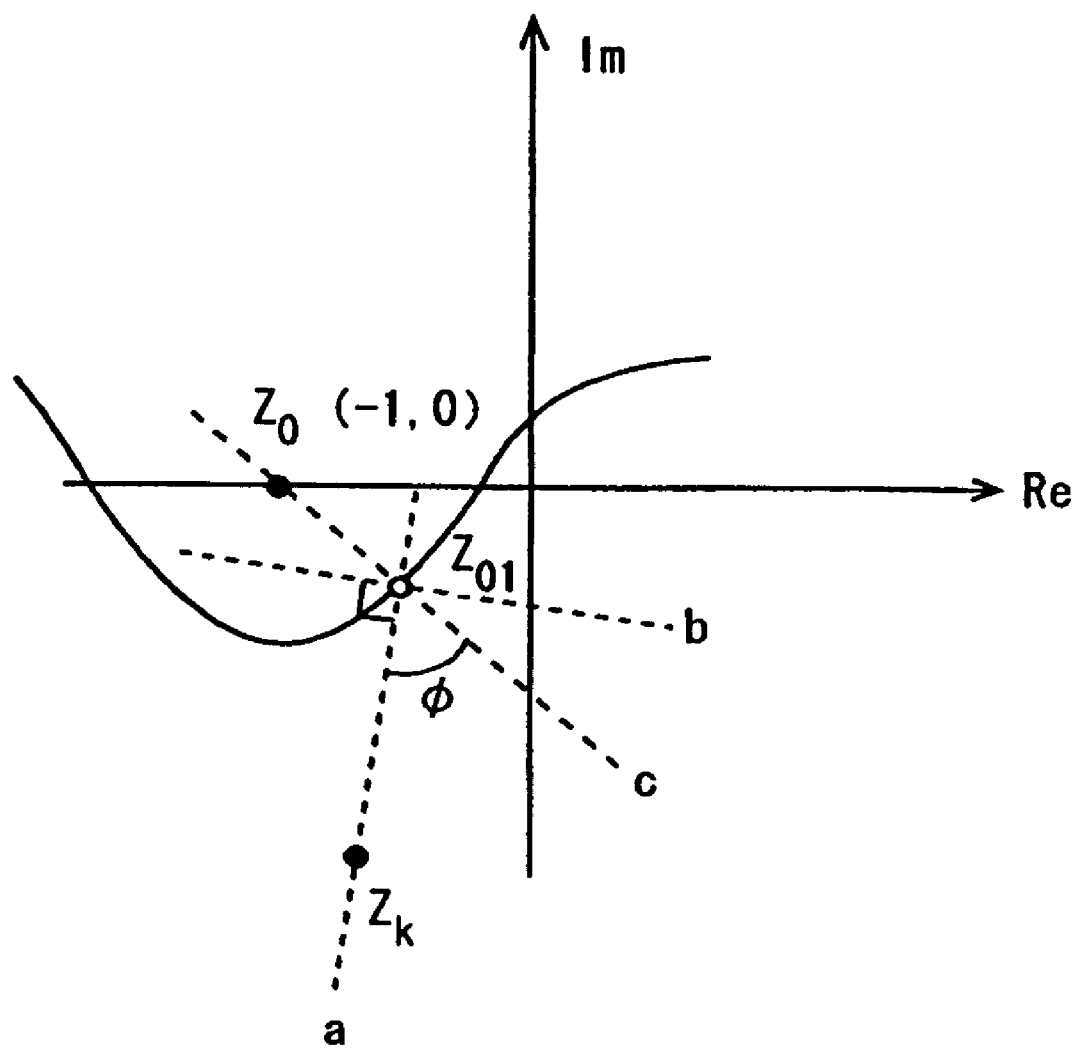
FIG. 9 is yet another Nyquist diagram showing the conditions that the open-loop transfer functions of the servo system according to the present embodiment satisfy.

In order for the system to be stable, it is necessary that the vector locus of the open-loop transfer function H should not circle the point of $Z_0$ (−1, 0) and that $Z_0$ be present outside the curve (locus) extending from a point in the neighborhood of $Z_{01}$ through $Z_k$ to another neighboring point. This requirement is satisfied if, as shown in FIG. 8A, in a direction orthogonal to the straight line that connects $Z_{01}$ and $Z_k$, the straight line extending from $Z_{01}$ exists below $Z_0$, i.e., between $Z_0$ and $Z_k$. Conversely, the system may become unstable if, as shown in FIG. 8B, the line extending from $Z_{01}$ exists above $Z_0$ in the orthogonal direction to the line that connects $Z_{01}$ and $Z_k$. The system may therefore be stabilized if, as shown in FIG. 9, the angle "φ" formed by a straight line "c" extending from $Z_0$ to $Z_{01}$ and a straight line "a" extending from $Z_{01}$ to $Z_k$ is 90 degrees or less. In other words, changing numeric expression (7) into

[Numeric Expression 19]

$$Z_k = PC(1+F) = Z_{01}(1+F) = Z_{01} + \lambda(Z_{01} - Z_0)e^{j\phi\lambda > 0} \qquad (15)$$

and then calculating the angle at "kω0" of F yields:

[Numeric expression 20]

$$LF(z_k) = L\frac{(Z_{01} - Z_0)}{Z_{01}} + \phi \qquad (16)$$

If φ is 90 degrees or less, the system may be stabilized. Taking the right side of numeric expression (13) as "α", enables the system to be stabilized, provided that the following numeric expression (17) is satisfied:

[Numeric Expression 21]

$$|\phi F(k\omega_0) - \alpha| \leq 90° \qquad (17)$$

However, it reduces system stability if the vector locus of the open-loop transfer function H approaches $Z_0$ (1, 0). In addition, it is important that there be a phase margin in the servo system. During the design of the servo system, it is preferable that 30 degrees be set as the phase margin. Hence, it is preferable that the angle "φ" formed by the straight line "a" connecting $Z_{01}$ and $Z_k$ and the straight line "c" connecting $Z_0$ and $Z_{01}$ should be 60 degrees or less (|∠F (kω0)−α|≦/60 deg). Furthermore, the need may arise for a peak width to be spread for faster convergence of the peak filter. If that is the case, since original frequency characteristics are affected, the phase margin of 30 degrees is likely to decrease. It is therefore preferable that a greater phase margin be reserved. Accordingly, further preferably, the angle "φ" formed by the straight line "a" connecting $Z_{01}$ and $Z_k$ and the straight line "c" connecting $Z_0$ and $Z_{01}$ is 45 degrees or less (|∠F (kω0)−α|≦/45°). These requirements are satisfied at the rotating frequency of the magnetic disk 11 and at all its higher harmonics ("kω0"). On the straight line defined by points $Z_0$ and $Z_{01}$, if point $Z_k$ is present on an opposite side to point $Z_0$, across point $Z_{01}$, the angle "φ" is 0 degree. As described above, when conditional expressions for angle are represented using simultaneous inequalities, the number of terms for the peak filter 234 and coefficients of each term may be determined using LMI (Linear Matrix Inequalities). The peak filter 234 conducts a filtering process in accordance with the values thus predetermined. Description of LMI is omitted since it is a most commonly known technology as described in, for example, Stephen Boyd, etc., "Linear Matrix Inequalities in System and Control Theory", 1994, SIAM.

Although the above description has been given with the open-loop transfer function H1 [PC (1+F)] as an example, system stability may likewise be obtained under similar conditions by using open-loop transfer function H2 [P (C+F)]. For open-loop transfer function H, the following expression holds:

[Numeric Expression 22]

$$Z_k = P(C+F) = Z_{01} + \lambda(Z_{01} - Z_0)\lambda > 0 \qquad (18)$$

Therefore:

[Numeric expression 23]

$$F = \lambda \frac{Z_{01} - Z_0)}{P} \qquad (19)$$

is a most preferable transfer function of the peak filter 234. The angle requirement in this case is:

[Numeric expression 24]

$$\angle f(Z_k) = \angle \frac{Z_{01} - Z_0)}{P} \qquad (20)$$

As described above, according to the HDD in the present embodiment, it is possible to effectively compensate for RRO while at the same time maintaining servo system stability. While, in the present embodiment, the HDD may conduct data read and write processes, the present invention may also be applied to a reproduce-only device that conducts reproduction only. The invention, although particularly useful for a magnetic disk storage device, may be applied to other forms of storage devices such as an optical storage device for optically processing stored data, or to servo systems for other objects that are to be controlled.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A disk drive with a servo system for conducting position control of a head by use of the servo signal recorded on a recording disk, the servo system comprising:
    a head position signal generator configured to generate, from the servo signal read from the recording disk, a head position signal associated with a position of the head;
    a peak filter having a peak at each of a plurality of frequencies, the peak filter compensating for a repeatable run-out error; and
    a control signal output unit which, on the basis of the head position signal, a reference signal, and an output of the peak filter, outputs a control signal for a driving device for moving the head;
    wherein, in a Nyquist diagram based on an open-loop transfer function of the servo system, when:
    with regard to each of all peaks of "ωk", except "ω=0", of the peak filter where k is an integer greater than or equal to 1,
    $Z_0$ is a point (−1, 0),
    $Z_{01}$ is a point of the open-loop transfer function of the servo system at "ωk" in the case where the peak filter is not present, and
    $Z_k$ is a point of the open-loop transfer function of the servo system at "ωk" in the case where the peak filter is present,
    the angle formed by a straight line extending from the $Z_0$ point toward the $Z_{01}$ point and a straight line extending from the $Z_{01}$ point toward the $Z_k$ point is 90° or less.

2. The disk drive according to claim 1, wherein the angle formed by the straight line extending from the $Z_0$ point toward the $Z_{01}$ point and the straight line extending from the $Z_{01}$ point toward the $Z_k$ point is 60° or less.

3. The disk drive according to claim 1, wherein the angle formed by the straight line extending from the $Z_0$ point toward the $Z_{01}$ point and the straight line extending from the $Z_{01}$ point toward the $Z_k$ point is 45° or less.

4. The disk drive according to claim 1, wherein the angle formed by the straight line extending from the $Z_0$ point toward the $Z_{01}$ point and the straight line extending from the $Z_{01}$ point toward the $Z_k$ point is 0°.

5. The disk drive according to claim 1, wherein each peak of the peak filter matches an integer multiple of a rotating frequency of the recording disk.

6. The disk drive according to claim 1, wherein:
    the recording disk comprises a plurality of tracks each having an M number of servo sectors; and
    the peak filter generates an output signal on the basis of a sum of the output of the peak filter at an Mth previous sector and the value obtained by multiplying, by a weighting coefficient, the plurality of state variables input during movement from a preset Nth previous sector to a current sector.

7. The disk drive according to claim 6, wherein each state variable is a deviation signal based on a differential between the reference signal and the head position signal.

8. The disk drive according to claim 6, wherein:
    each state variable is a deviation signal based on a differential between the reference signal and the head position signal; and
    the peak filter is inserted between an output of the deviation signal and an input of the control signal output unit.

9. The disk drive according to claim 6, wherein:
    each state variable is a deviation signal based on a differential between the reference signal and the head position signal; and
    the peak filter takes the output of the deviation signal as an input, wherein an output of the control signal output unit and the output of the peak filter are added.

10. The disk drive according to claim 1, wherein:
    the recording disk comprises a plurality of tracks each having an M number of servo sectors; and
    the peak filter conducts processing based on the following expression:

$$u(n) = u(n-M) + \sum_{k=0}^{N} w_k X(n-k)$$

u: peak filter output,
M: number of servo sectors in one track,
w: previously set real number,
X: state variable in the servo system, and
N: previously set natural number,
where Σ is a sum of the plural terms selected from "k=0 to N".

11. A disk drive with a servo system for conducting head position control by use of the servo signals recorded on a recording disk, the servo system comprising:

a head configured to access the recording disk having a plurality of tracks each including an M number of servo sectors, the head reading the servo signals of each servo sector;

a peak filter that outputs a value based on a sum of the value obtained by multiplying, by a weighting coefficient, the plurality of state variables input during movement from a preset Nth previous sector to a current sector, and the value output at an Mth previous sector; and a control signal output unit which, on the basis of head position signals associated with the positions of the head that are determined from the servo signals of each servo sector, a reference signal, and an output of the peak filter, outputs a control signal for a driving device for moving the head;

wherein, in a Nyquist diagram based on an open-loop transfer function of the servo system, when:

with regard to each of all poles "$\omega k$", except "$\omega=0$", of the peak filter where k is an integer greater than or equal to 1, $Z_0$ is a point (−1, 0), $Z_{01}$ is a point of the open-loop transfer function of the servo system at "$\omega k$" in the case where the peak filter is not present, $Z_k$ is a point of the open-loop transfer function of the servo system at "$\omega k$" in the case where the peak filter is present, the angle formed by a straight line extending from the $Z_0$ point toward the $Z_{01}$ point and a straight line extending from the $Z_{01}$ point toward the $Z_k$ point is 90° or less.

12. The disk drive according to claim 11, wherein the angle formed by the straight line extending from the $Z_0$ point toward the $Z_{01}$ point and the straight line extending from the $Z_{01}$ point toward the $Z_k$ point is 60° or less.

13. The disk drive according to claim 11, wherein the angle formed by the straight line extending from the $Z_0$ point toward the $Z_{01}$ point and the straight line extending from the $Z_{01}$ point toward the $Z_k$ point is 45° or less.

14. The disk drive according to claim 11, wherein:

each state variable is a deviation signal based on a differential between the reference signal and the head position signal; and the peak filter is inserted between an output of the deviation signal and an input of the control signal output unit.

15. The disk drive according to claim 11, wherein:

each state variable is a deviation signal based on a differential between the reference signal and the head position signal; and the peak filter takes the output of the deviation signal as an input, wherein an output of the control signal output unit and the output of the peak filter are added.

16. The disk drive according to claim 11, wherein the peak filter conducts processing based on the following expression:

$$u(n) = u(n-M) + \sum_{k=0}^{N} w^k X(n-k)$$

u: peak filter output,
M: number of servo sectors in one track,
w: previously set real number,
X: state variable in the servo system, and N: previously set natural number, where, however, $\Sigma$ is a sum of the plural terms selected from "k=0 to N".

17. A method of head position control in a disk drive, intended to conduct position control of a head by use of the servo signals recorded on a recording disk, the method comprising:

accessing the recording disk that has a plurality of tracks each including an M number of servo sectors;

reading the servo signals of each servo sector; and in accordance with the head position signals determined from the servo signals of each servo sector, the head position signals being associated with positions of the head, a reference signal, and a value based on a sum of the value obtained by multiplying, by a weighting coefficient, the plurality of state variables input during movement from a preset Nth previous sector to a current sector, and the output of the peak filter that is generated at an Mth previous sector, providing an output of a control signal for a driving device which moves the head;

wherein, in a Nyquist diagram based on an open-loop transfer function of the servo system, when:

with regard to all polar "$\omega k$", except "$\omega=0$", of the peak filter where k is an integer greater than or equal to 1, $Z_0$ is a point (−1, 0), $Z_{01}$ is a point of the open-loop transfer function of the servo system at "$\omega k$" in the case where the above-mentioned peak filter is not present, and $Z_k$ is a point of the open-loop transfer function of the servo system at "$\omega k$" in the case where the above-mentioned peak filter is present, the $Z_0$ point is present outside a curve extending from the neighborhood of the $Z_{01}$ point, through the $Z_k$ point, toward the $Z_{01}$ point.

18. The method of head position control in a disk drive according to claim 17, wherein the angle formed by a straight line extending from the $Z_0$ point, toward the $Z_{01}$ point, and a straight line extending from the $Z_{01}$ point, toward the $Z_k$ point, is 90° or less.

19. A servo system for positioning, on a rotary body, an object to be controlled, the servo system comprising:

a servo signal reader configured to read the servo signal recorded on the rotary body; and a controller having a peak filter whose gains at each of plural frequencies equal to integral multiples of a rotating speed of the rotary body are equal to or greater than defined values, the controller generating, in accordance with the servo signal, with a reference signal, and with an output of the peak filter, a control signal for controlling a position of the object to be controlled;

wherein, in a Nyquist diagram based on an open-loop transfer function of the servo system, when with regard to all peaks of "$\omega k$", except "$\omega=0$", of the peak filter where k is an integer greater than or equal to 1, $Z_0$ is a point (−1, 0), $Z_{01}$ is a point of the transfer function of the servo system at "$\omega k$" in the case where the peak filter is not present, and $Z_k$ is a point of the open-loop transfer function of the servo system at "$\omega k$" in the case where the peak filter is present, the angle formed by a straight line extending from the $Z_0$ point toward the $Z_{01}$ point and a straight line extending from the $Z_{01}$ point toward the $Z_k$ point is 90° or less.

20. The servo system according to claim 19, wherein:

the rotary body comprises a plurality of tracks each having an M number of servo sectors; and the peak filter generates an output signal on the basis of a sum of the output of the peak filter at an Mth previous sector and the value obtained by multiplying, by a weighting coefficient, the plurality of state variables input during movement from a preset Nth previous sector to a current sector.

* * * * *